US011424498B2

(12) United States Patent
Masaryk et al.

(10) Patent No.: US 11,424,498 B2
(45) Date of Patent: Aug. 23, 2022

(54) BATTERY PACK FOR A VEHICLE

(71) Applicant: SAMSUNG SDI CO., LTD., Yongin-si (KR)

(72) Inventors: Carl-Michael Masaryk, Graz (AT); Matthias Pucher, Graz (AT); Thomas Hoermann, Graz (AT)

(73) Assignee: SAMSUNG SDI CO., LTD., Yongin-si (KR)

(*) Notice: Subject to any disclaimer, the term of this patent is extended or adjusted under 35 U.S.C. 154(b) by 157 days.

(21) Appl. No.: 16/600,179

(22) Filed: Oct. 11, 2019

(65) Prior Publication Data
US 2020/0119418 A1 Apr. 16, 2020

(30) Foreign Application Priority Data

Oct. 12, 2018 (EP) .................................... 18200163
Oct. 10, 2019 (KR) ........................ 10-2019-0125521

(51) Int. Cl.
H01M 10/6568 (2014.01)
H01M 10/613 (2014.01)
H01M 10/6556 (2014.01)
H01M 10/625 (2014.01)

(52) U.S. Cl.
CPC ..... H01M 10/6568 (2015.04); H01M 10/613 (2015.04); H01M 10/625 (2015.04); H01M 10/6556 (2015.04); H01M 2220/20 (2013.01)

(58) Field of Classification Search
CPC ........... H01M 10/6568; H01M 10/613; H01M 10/625; F05D 2260/213
See application file for complete search history.

(56) References Cited

U.S. PATENT DOCUMENTS 9,178,253 B2 * 11/2015 Chung .................. H01M 50/20
2012/0090348 A1 4/2012 O'Rourke et al.
2018/0111499 A1 4/2018 Wada et al.
2018/0241102 A1 * 8/2018 Kim .................. H01M 10/6568

FOREIGN PATENT DOCUMENTS

CN          106450568 A        2/2017
FR             3005901 A1 *   11/2014  ............ H01M 10/66
KR    10-2018-0096081 A       8/2018
KR       20180096081 A *       8/2018
WO    WO 2018/070675 A1       4/2018

OTHER PUBLICATIONS

Extended European Search Report corresponding to EP 18200163.6, dated Apr. 24, 2019, 8 pages.

* cited by examiner

Primary Examiner — Maria Laios
Assistant Examiner — Jordan E Berresford
(74) Attorney, Agent, or Firm — Lewis Roca Rothgerber Christie LLP

(57) ABSTRACT

A battery pack for a vehicle is provided. The battery pack includes: a plurality of battery modules and a liquid cooling circuit. At least one of the battery modules is arranged in two different levels from among a plurality of levels of the battery pack, the levels of the battery pack being adjacent each other in a vertical direction. The liquid cooling circuit is in thermal contact with the battery modules in the two different levels of the battery pack, and the liquid cooling circuit includes a bypass tube having an inlet opening at a highest point of the liquid cooling circuit in the vertical direction and an outlet opening within the liquid cooling circuit at a lower point of the liquid cooling circuit than the highest point of the liquid cooling circuit.

6 Claims, 7 Drawing Sheets

BATTERY PACK FOR A VEHICLE

CROSS-REFERENCE TO RELATED APPLICATIONS

This application claims priority to and the benefit of European Patent Application No. 18200163.6, filed in the European Patent Office on Oct. 12, 2018, and Korean Patent Application No. 10-2019-0125521, filed in the Korean Intellectual Property Office on Oct. 10, 2019, the entire content of both of which are incorporated herein by reference.

BACKGROUND

1. Field

Aspects of embodiments of the present invention relate to a cooling circuit of a vehicle battery pack.

2. Related Art

In recent years, vehicles for transportation of goods and people have been developed that use electric power as a source for motion. Such electric vehicles are automobiles that are propelled by an electric motor using energy stored in rechargeable batteries. An electric vehicle may be solely powered by batteries or may be a hybrid vehicle powered by, for example, a gasoline generator. Furthermore, the vehicle may include a combination of an electric motor and a conventional combustion engine.

Generally, an electric-vehicle battery (EVB) or traction battery is a battery used to power the propulsion of battery electric vehicles (BEVs). Electric-vehicle batteries differs from starting, lighting, and ignition batteries in that they are designed to output power for sustained periods of time.

A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction between the positive electrode, the negative electrode, and the electrolyte solution. The shape of the case, for example, cylindrical or rectangular, may be determined based on the battery's intended purpose. Lithium-ion (and similar lithium polymer) batteries, widely known via their use in laptops and consumer electronics, are the predominant power source for the most recent electric vehicles in development.

Rechargeable batteries may be used in a battery module formed of a plurality of unit battery cells coupled to each other in series and/or in parallel to provide relatively high energy density, for example, for driving a motor of a hybrid vehicle. For example, the battery module may be formed by interconnecting the electrode terminals of the plurality of unit battery cells to each other, the number of unit battery cells being determined based on a desired amount of power, in order to realize a high-power rechargeable battery.

A battery pack is a set (or group, pack, etc.) of any number of battery modules. The battery modules may be connected to each other in series, parallel, or a mixture of both to deliver the desired voltage, capacity, and/or power density. Components of battery packs include the individual battery modules and interconnects, which provide electrical conductivity between the battery modules. A battery management system (BMS) may be provided to manage the battery pack, such as by protecting the battery module (or unit battery cells) from operating outside its safe operating area, monitoring its state, calculating secondary data, reporting that data, controlling its environment, authenticating it, and/or balancing it.

The mechanical integration of such a battery pack includes appropriate mechanical connections between the individual components of, for example, the battery modules, between the battery modules, and a supporting structure of the vehicle. These connections should remain functional and safe throughout the average service life of the battery system. Further, installation space and interchangeability requirements must be met, especially in mobile applications.

Mechanical integration of battery modules may be achieved by providing a carrier framework and by positioning the battery modules thereon. Fixing the battery cells and/or battery modules may be achieved by fitted depressions in the carrier framework or by mechanical interconnectors, such as bolts or screws. Alternatively, the battery modules may be confined by fastening side plates to lateral sides of the carrier framework. Further, cover plates may be fixed atop and below the battery modules.

The carrier framework of the battery pack may be mounted to a carrying structure of the vehicle. When the battery pack is to be fixed at the bottom of the vehicle, the mechanical connection may be established from the bottom side by, for example, bolts passing through the carrier framework of the battery pack. The framework is usually made of aluminum or an aluminum alloy to lower the total weight of the assembly.

Battery systems according to the related art, despite any modular structure, usually include a battery housing that acts as enclosure to seal the battery system against the environment and provides structural protection for the battery system's components. Housed battery systems are usually mounted as a whole (e.g., as a unit) into their application environment, such as an electric vehicle.

In some battery packs, the battery modules may be arranged at different levels of the battery pack with respect to the mounting direction of the battery pack. In this case, the framework may include respective supporting structures in (or between) the different levels of the battery pack, like cross braces, at where the battery modules are attached to the framework.

To provide thermal control of the battery pack, a thermal management system may be employed to safely use the battery modules by efficiently emitting, discharging, and/or dissipating heat generated from the rechargeable batteries therein. If the heat emission/discharge/dissipation is not sufficiently performed, temperature deviations may occur between respective battery cells and the battery modules may not generate a desired amount of power. In addition, an increase in the internal temperature of the battery cells may lead to abnormal reactions occurring therein, and thus, charging and discharging performance of the rechargeable batteries may deteriorate and the life-span of the rechargeable batteries may be shortened. Thus, cell cooling to effectively emit/discharge/dissipate heat from the battery cells is desired, and high-voltage traction battery systems generally include a thermal conditioning system (e.g., a thermal management system) to increase the lifetime and ensure adequate performance of the battery systems.

The thermal management system may include a cooling circuit (e.g., a liquid cooling circuit). Generally, the liquid cooling circuit may include several components, such as cooling plates in thermal contact with the battery modules, pipes or hoses for forwarding (or transporting) the liquid coolant (e.g., the liquid cooling fluid), and coolant interfaces for connecting the pipes or hoses and the cooling plates to a vehicle's cooling circuit.

During assembly or after maintenance of the cooling system, a liquid cooling fluid must be (re)filled into the cooling circuit and, therefore, related art cooling systems may be equipped with a venting system to expel air introduced during this process. For example, spring-type valves may be positioned at the highest point of the cooling system, where the air usually accumulates. The spring-type valves may be operated manually to vent the cooling circuit. However, due to its position, the valve is usually not freely accessible after installation on a vehicle and venting the cooling system is complicated. Furthermore, the valve may loosen over the lifetime of the battery system due to different material properties of valve(s) and coolant tubes. These disadvantages may particularly occur in cooling systems for battery packs that include battery modules assembled on different levels.

It is thus an object of embodiments of the present invention to overcome or at least mitigate some of the drawbacks of the related art and to provide a battery pack in which the process of venting the liquid cooling circuit is simplified.

SUMMARY

One or more of the drawbacks of the prior art are avoided or at least mitigated according to embodiments of the present invention.

Aspects of embodiments of the present invention provide a battery pack for a vehicle. The battery pack includes: a plurality of battery modules and a liquid cooling circuit. At least one of the battery modules is arranged in two different levels from among a plurality of levels of the battery pack, and the levels of the battery pack are adjacent each other in a vertical direction. The liquid cooling circuit is in thermal contact with the battery modules in the two different levels of the battery pack, and the liquid cooling circuit includes a bypass tube having an inlet opening at a highest point of the liquid cooling circuit in the vertical direction and an outlet opening within the liquid cooling circuit at a lower point of the liquid cooling circuit than the highest point of the liquid cooling circuit.

Hence, an embodiment of the present invention provides a battery pack including a plurality of battery modules that are arranged at different levels of the battery pack with respect to the mounting direction of the battery pack on the vehicle. For example, the battery pack may include a lower level at a bottom of the battery pack (e.g., at a bottom in a gravitational direction) at where one or more battery modules are arranged and an upper level at where one or more other battery modules are arranged. The upper level is located between the lower level and the topside (e.g., the upper end) of the battery pack facing the vehicle. A framework of the battery pack may include respective supporting structures in the different levels of the battery pack, such as cross braces, and the battery modules may be attached to the battery pack via the supporting structures.

Each battery module may equipped with (e.g., may include) cooling elements to ensure thermal control of the battery modules. These cooling elements may be part of a common liquid cooling circuit, which includes additional components to promote and distribute the liquid cooling fluid, such as water. The liquid cooling circuit extends over (or through) the levels of the battery pack at where battery modules are arranged. Generally, the liquid cooling fluid will be introduced into the lower level of the battery pack causing a higher flow velocity in this area (e.g., at this level) compared to higher levels of the battery pack. During assembly or after maintenance of the cooling system, the liquid fluid must be (re)filled into the cooling circuit. However, during this process, air may be introduced into the cooling system and may accumulate at the highest point of the liquid cooling circuit.

Therefore, one feature of embodiments of the present invention is a bypass tube integrated into the liquid cooling circuit in place of related art venting valves. An upper end of the bypass tube is positioned at the highest point of the liquid cooling circuit, where air accumulates, and a lower end of the bypass tube merges into a lower part of the liquid cooling circuit. Due to the higher flow speed of the coolant in the lower part (e.g., the lower level) of the liquid cooling circuit, negative pressure is generated (e.g., is generated in the bypass tube) and air accumulated at the highest point of the liquid cooling circuit is sucked through the bypass tube. Ventilation may thus be achieved downstream the lower end of the bypass tube, and ventilation valves at the highest point of the cooling circuit may be omitted. For example, the inlet opening of the bypass tube may be positioned at the highest point and upstream of the liquid cooling circuit, and the outlet opening of the bypass tube may be positioned at a lower (or lowest) point and downstream of the liquid cooling circuit within the liquid cooling circuit. The difference in pressure at the inlet opening and outlet opening should be as high as possible.

According to one embodiment, the outlet opening of the bypass tube is positioned in a cooling tube provided at the lowest level of the battery pack. For example, the part of the cooling circuit at where the lower end of the bypass tube is located is (or is in) a cooling tube. The lower end of the bypass tube may be arranged such that the outlet opening faces in (or faces parallel to) a flow direction of the liquid fluid to create negative pressure in the bypass tube. The outlet opening may be positioned centrally within the cooling tube, and thereby, the coolant fluid velocity flowing around the outlet opening will be homogeneous or substantially homogenous.

The bypass tube may be a separate cooling circuit component and may be directly accessible from outside of the cooling circuit. For example, the bypass tube may include a hose coupled to respective connection ports provided at cooling tubes. These connection ports merge into the inlet opening and the outlet opening, respectively. However, according to another embodiment, the cooling circuit includes a connection tube vertically extending between the levels of the battery pack, and the bypass tube passes through the interior of the connection tube. For example, the bypass tube is not directly accessible from outside of the cooling circuit but extends inside the connection tube. This embodiment requires less build space and assembly efforts but reduces the serviceability of the bypass tube.

According to an embodiment, a ratio of a cross-sectional size of the outlet opening of the bypass tube to a cross-sectional size of the cooling tube at the outlet opening is in a range of about 1:2 to about 1:10, preferably in a range of about 1:3 to 1:5. Keeping the cross-sectional sizes in these ranges ensures that the bypass tube assembly has no significant inhibitory effect on fluid velocity and the thermal performance of the cooling circuit following downstream.

The bypass tube may be formed of (or may include) any suitable material. However, when the inlet opening is positioned in a component of the liquid circuit that is made of (or includes) a plastic material, the bypass tube may also be made of (or may include) the same plastic material. Thereby, tightness problems and material failure caused by different thermal expansion rates may be avoided. Furthermore, the bypass tube may be integrally formed with other parts of the cooling circuit to simplify the assembly process of the battery pack.

According to another embodiment, aspects of which may be combined with any of the above-described embodiments, a carrier plate may be arranged at the uppermost level of the battery pack, and the carrier plate may include an integral cooling channel structure. The cooling circuit may further include a coolant recipient connected to outlet openings in the integral cooling channel structure of the carrier plate, and the inlet opening of the bypass tube is positioned at the coolant recipient. Thus, no additional component need to be integrated into the cooling circuit, and instead a modified coolant recipient may be used.

Further aspects and features of the present invention can be learned from the following description.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Figure 1:
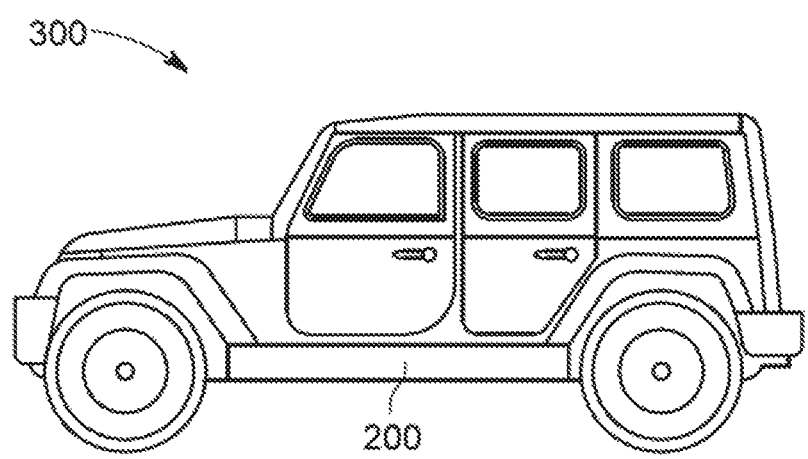
FIG. 1 is a schematic view of a vehicle including a battery pack.

Reference will now be made, in detail, to embodiments of the present invention, examples of which are illustrated in the accompanying drawings. Aspects and features of the exemplary embodiments, and implementation methods thereof, will be described with reference to the accompanying drawings. In the drawings, like reference numerals denote like elements, and redundant descriptions thereof may be omitted. As used herein, the term "may" when describing embodiments of the present invention refers to "one or more embodiments of the present invention." As used herein, the term "and/or" includes any and all combinations of one or more of the associated listed items.

Herein, the terms "upper" and "lower" are defined according to the z-axis as shown in the drawings, which may refer to a gravitational direction. For example, the upper side is positioned at the upper part of the z-axis, and the lower side is positioned at the lower part thereof. In the drawings, the sizes of elements may be exaggerated for clarity. For example, in the drawings, the size or thickness of elements may be arbitrarily shown for illustrative purposes, and thus, the present invention should not be construed as being limited thereto.

It will be understood that, although the terms "first" and "second" are used to describe various elements, these elements should not be limited by these terms. These terms are used to distinguish one element from another element. For example, a first element may be named a second element and, similarly, a second element may be named a first element without departing from the scope of the present invention.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

As used herein, the terms "substantially," "about," and similar terms are used as terms of approximation and not as terms of degree, and are intended to account for the inherent variations in measured or calculated values that would be recognized by those of ordinary skill in the art. Also, as used herein, the terms "use," "using," and "used" may be considered synonymous with the terms "utilize," "utilizing," and "utilized," respectively. Also, the term "exemplary" is intended to refer to an example or illustration.

As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Battery packs of electric or hybrid vehicles demand huge space and are, therefore, usually positioned at the lower side of the vehicle bodies. For example, the battery pack may be fixed to a floor of a vehicle carrying structure. Battery packs, according to the related art, despite having a modular structure, generally include a battery housing that acts as an enclosure to seal the battery pack against the environment and provides structural protection for the battery pack's components. Housed battery packs are generally mounted as a whole (e.g., as a unit) into their application environment, such as an electric vehicle. In other cases, battery packs may be structurally integrated in the vehicle carrying structure and may include attachment devices that are configured to be connected to the vehicle body for structural integration. In other words, the vehicle body part may include the battery system carrier, and the battery system carrier may be directly integrated into the vehicle body instead of being mounted or attached to the vehicle body. Embodiments of the present invention are applicable to and can be realized in any of the above-mentioned variants (e.g., in either separate or integral battery packs).

Figure 2:
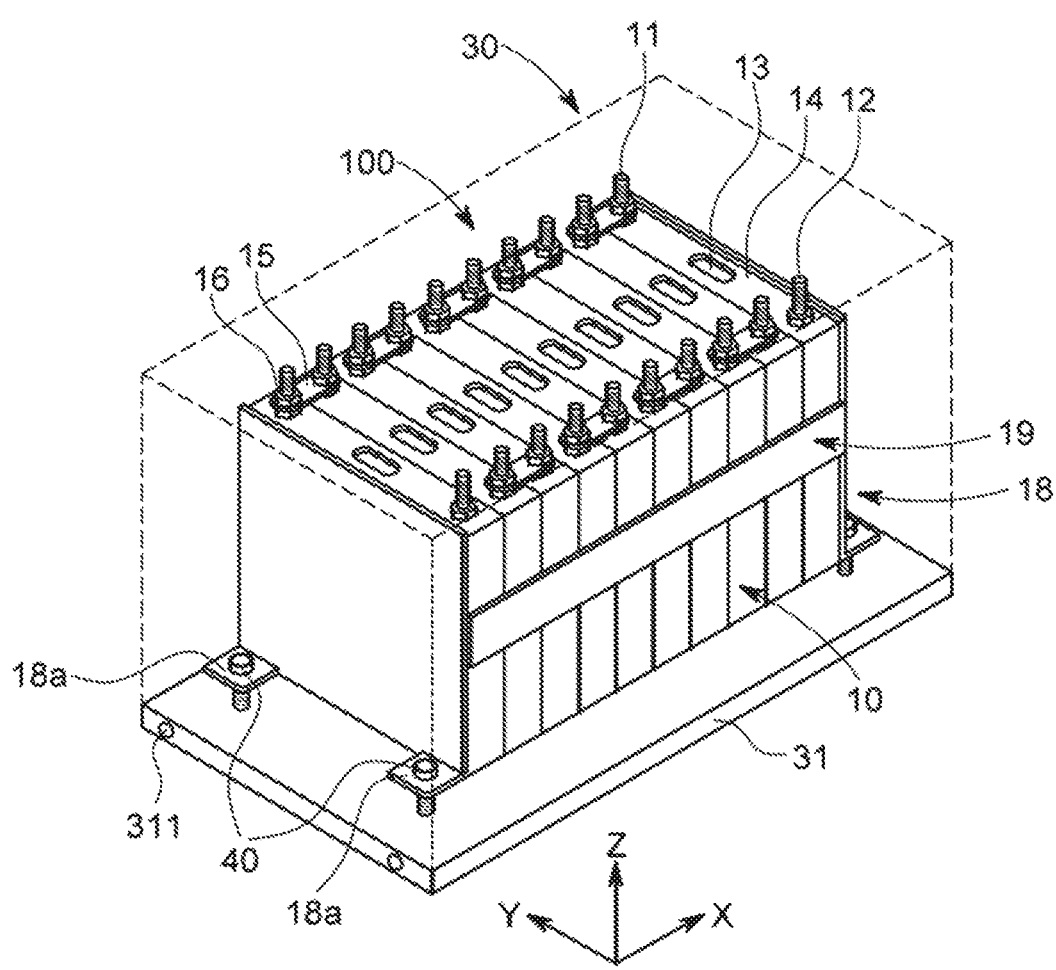
FIG. 2 is a perspective view of a battery module.

FIG. 1 schematically illustrates a vehicle 300 including a battery pack 200 mounted to the floor of a carrying structure (e.g., a frame) of a vehicle 300, and FIG. 2 shows an exemplary embodiment of a battery module 100.

Referring to FIG. 2, the battery module 100 includes a plurality of battery cells 10 aligned in one direction. A pair of end plates 18 face wide surfaces of the battery cells 10 at the outside (e.g., at the outermost ends) of the battery cells 10, and a connection plate 19 connects the pair of end plates 18 to each other, thereby fixing the plurality of battery cells 10 together. Fastening portions 18a on both sides of the battery module 100 are fastened to a carrier plate 31 by bolts 40. Thus, a top surface of the carrier plate 31 supports the battery module 100. The carrier plate 31 may be part of a module housing 30.

In the embodiment illustrated in FIG. 2, each battery cell 10 is a prismatic (or rectangular) battery cell, and the wide, flat surfaces of the battery cells 10 are stacked together to form the battery module 100. Further, each battery cell 10 includes a battery case accommodating an electrode assembly and an electrolyte. The battery case is hermetically sealed by a cap assembly 14. The cap assembly 14 includes positive and negative electrode terminals 11 and 12, which have different polarities from each other, and a vent 13. The vent 13 is a safety device for the battery cell 10 and acts as a passage through which gas generated in the battery cell 10 can be exhausted to the outside of the battery cell 10.

The positive and negative electrode terminals 11 and 12 of neighboring (or adjacent) battery cells 10 are electrically connected to each other via a bus bar 15, and the bus bar 15 may be fixed to the positive and negative electrode terminals 11 or 12 by a nut 16 or the like. Hence, the battery module 100 may be used as power source unit by electrically connecting the plurality of battery cells 10 to each other as one bundle. The battery pack 200 may include a plurality of battery modules 100.

The battery cells 10 generate a large amount of heat while being charged/discharged. The generated heat accumulates in the battery cells 10, thereby accelerating the deterioration of the battery cells 10. Therefore, the carrier plate 31 of the battery module 100 includes an integral cooling channel (e.g., an integral cooling channel structure) having two inlet openings 311 at a side wall of the carrier plate 31. The integral cooling channel structure is adjacent to the bottom surface of the battery cells 10 to cool the battery cells 10. The integral cooling channel structure includes a hollow profile including coolant channels that fluidly connect the inlet openings 311 and outlet openings that are at an opposite side wall of the carrier plate 31. The hollow profile may have various cross-sectional shapes, such as a circular or a rectangular cross-sectional shape. In some embodiments, the hollow profile is an extruded aluminum profile. Such lightweight extruded profiles can be manufactured relatively easily and cost-effectively.

The integral cooling channel structure is part of a liquid cooling circuit (e.g., a cooling circuit) of the battery pack 200. The cooling circuit may include several other components in addition to the carrier plates 31 with the integral cooling channel structures, such as pumps, pipes or hoses for forwarding (or transporting) the liquid coolant, and coolant distributors or interfaces for connecting the pipes or hoses to the carrier plates 31 and to a vehicle's cooling circuit.

Figure 3:
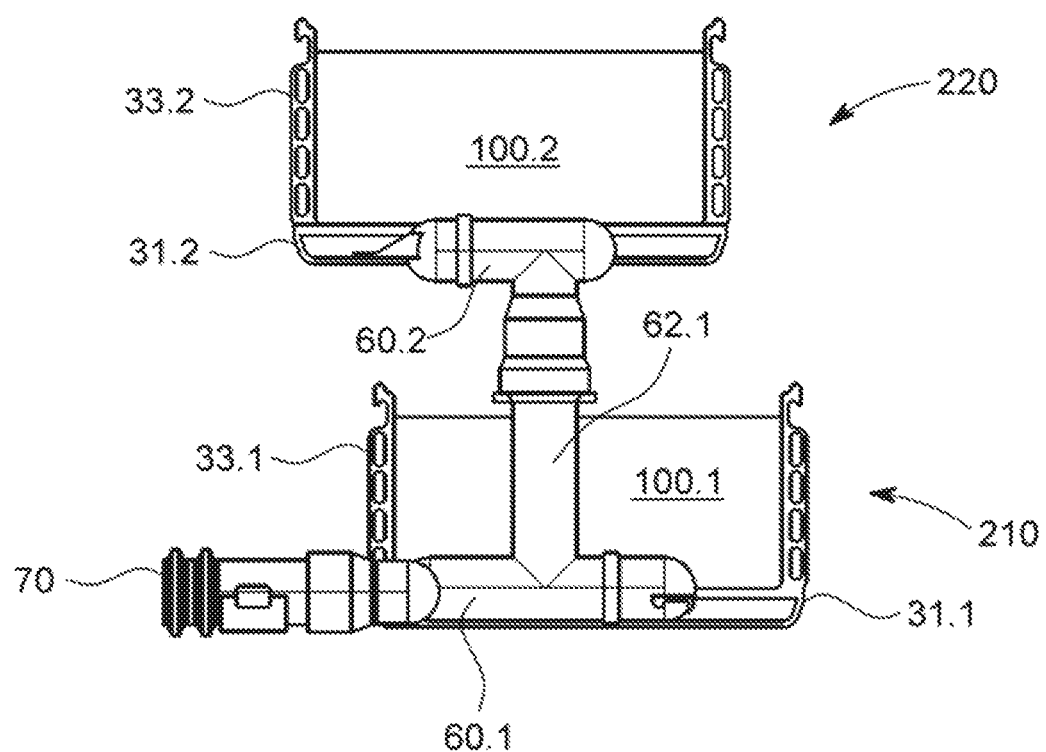
FIGS. 3 and 4 are schematic front and back views, respectively, of a part of a two-level battery pack including components of a liquid cooling circuit and a bypass tube according to an embodiment of the present invention.
Figure 4:
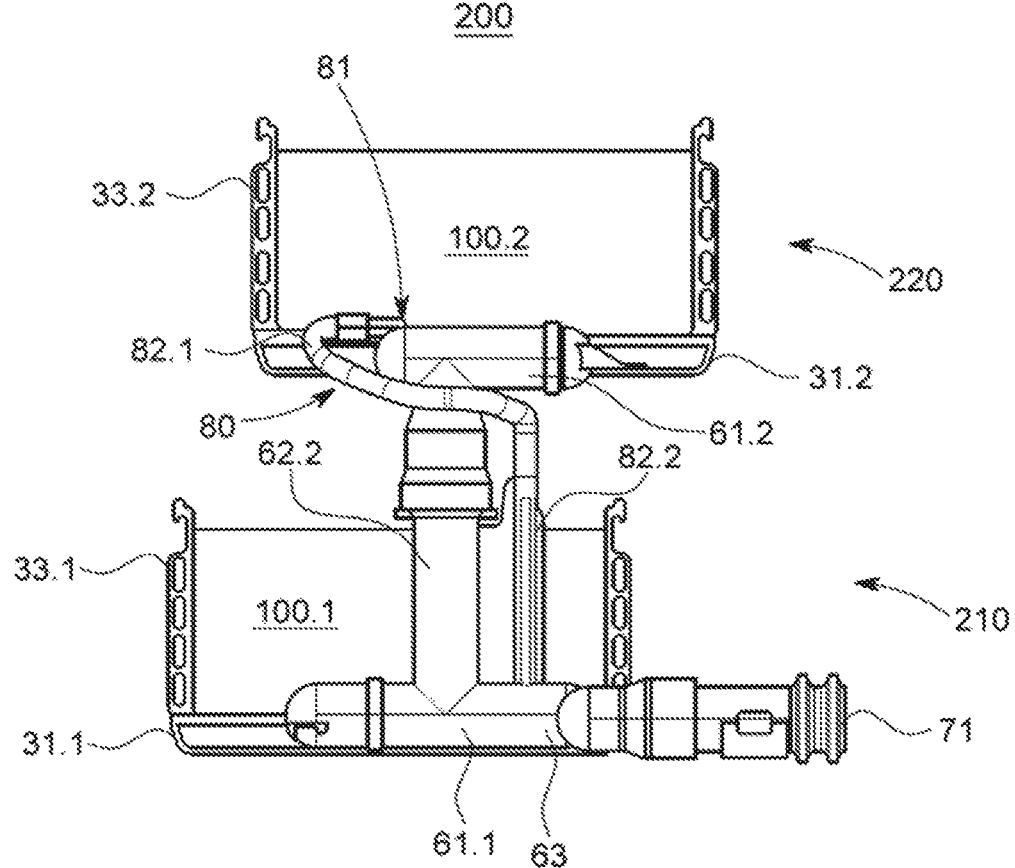

According to the exemplary embodiment illustrated in FIGS. 3 and 4, the battery pack 200 is a multi-level (e.g., a two-level) battery pack. The battery pack 200 includes a lower level (or floor) 210 where first battery modules 100.1 lie within a common plane (only one battery module 100.1 is illustrated for clarity) and an upper level 220 where second battery modules 100.2 are arranged (only one battery module 100.2 is illustrated for clarity). When the battery pack 200 is mounted to the vehicle 300, the upper level 220 faces (e.g., is nearer to) the underbody of the vehicle 300.

The battery modules 100.1 and 100.2 are each provided on (or each include) carrier plates 31.1 and 31.2, which, together with two side plates 33.1 and 33.2, form a part of a housing for the battery modules 100.1 and 100.2. The side plates 33.1 and 33.2 and the carrier plates 31.1 and 31.2 may be made of (or may include) extruded aluminum. The battery cells 10 of the battery modules 100.1 and 100.2 are respectively arranged on a top surface of the carrier plates 31.1 and 31.2. Inlet openings that are in fluid connection with an integral cooling channel structure of the carrier plates 31.1 and 31.2 are provided at sidewalls of the carrier plates 31.1 and 31.2, as shown in FIG. 2. At the opposite end of the module housing, which is schematically illustrated in FIG. 4, corresponding outlet openings of the integral cooling channel structure are provided in the carrier plates 31.1 and 31.2.

Further, a liquid cooling circuit is in thermal contact with the battery modules 100.1 and 100.2 in each of the levels 210 and 220 of the battery pack 200. According to the exemplary embodiment illustrated in FIGS. 3 and 4, the cooling circuit includes coolant distributors 60.1 and 60.2, which are respectively coupled to the inlet openings of the integral cooling channel structures of the carrier plates 31.1 and 31.2, and coolant recipients 61.1 and 61.2, which are respectively coupled to the outlet openings of the integral cooling channel structures of the carrier plates 31.1 and 31.2.

Furthermore, connection tubes 62.1 and 62.2 vertically (e.g., in a gravitational direction) extend between the levels 210 and 220 of the battery pack 200 to allow coolant fluid circulation between the levels 210 and 220 of the battery pack 200. In the illustrated embodiment, the connection tubes 62.1 and 62.2 are respectively integrally formed with the coolant distributor 60.1 and the coolant recipient 61.1, but the present invention is not limited thereto. Further, a cooling tube 63 is attached downstream of the coolant recipient 61.1. According to the illustrated embodiment, the cooling tube 63 and coolant recipient 61.1 are integrally formed, but the present invention is not limited thereto.

A liquid fluid introduced into the cooling circuit via an inlet 70 will first enter the coolant distributor 60.1 at the lower level 210 of the battery pack 200. Some of the liquid fluid then passes to the coolant distributor 60.2 on upper level 220 via the connection tube 62.1 and then passes through the integral cooling channel structure of the carrier plate 31.2 while the remaining liquid fluid passes through the integral cooling channel structure of the carrier plate 31.1. Then, the liquid fluid exits the carrier plates 31.1 and 31.2 via the coolant recipients 61.1 and 61.2, respectively. After passing through the coolant recipient 61.1 at the lower level 210, the liquid fluid (e.g., all of the liquid fluid) flows towards the outlet 71 of the cooling circuit. The flow velocity of the fluid liquid in the cooling tube 63 flowing towards the outlet 71 is higher than the flow velocity of the liquid fluid in the coolant recipient 61.2 at the upper level 220.

As illustrated in FIG. 4, the liquid cooling circuit includes a bypass tube 80 with an inlet 81 positioned at a highest point of the cooling circuit, which, in the illustrated embodiment, is the uppermost part of the coolant recipient 61.2. An outlet (e.g., an outlet opening) 83 (see, e.g., FIG. 6) of the bypass tube 80 is positioned at a lower point of the cooling circuit, which, in the illustrated embodiment, is within the cooling tube 63.

A ratio of a cross-sectional size of the outlet 83 of the bypass tube 80 to a cross-sectional size of the cooling tube 63 at the outlet 83 may be in a range of about 1:2 to about 1:10, preferably in a range of about 1:3 to 1:5. The cross-sectional size of the bypass tube 80 may be substantially equal in all sections of (e.g., may be substantially constant throughout) the bypass tube 80. For example, the cross-sectional size of the bypass tube 80 at the inlet 81 may be similar to the cross-sectional size of the bypass tube 80 at the outlet 83.

In the embodiment illustrated in FIGS. 3 and 4, the bypass tube 80 has a first section 82.1, which is a flexible hose, and a second section 82.2, which is made of (or includes) a rigid plastic material and is firmly fixed to the connection tube 62.2 and the coolant recipient 61.1. In one embodiment, the second section 82.2 of the bypass tube 80 is made of (or includes) the same plastic material as that of the connection tube 62.2 and the coolant recipient 61.1. If air accumulates in the coolant recipient 61.2 at the upper level 220, the air will be sucked through the inlet (e.g., an inlet opening) 81 and exit the cooling circuit via the bypass tube 80 and the outlet 71.

Figure 5:
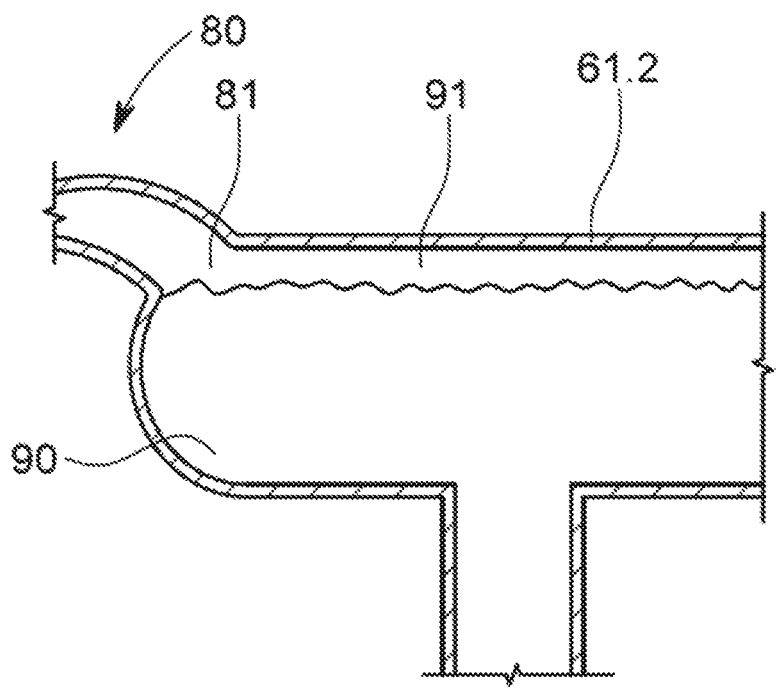
FIG. 5 is an enlarged cross-sectional view of an upper part of the bypass tube shown in FIG. 4.

FIG. 5 is a schematic cross-sectional illustration through a part of the coolant recipient 61.2 at where the inlet 81 of the bypass tube 80 is positioned. For purposes of illustration, a liquid fluid 90 is shown in FIG. 5. Above the liquid fluid 90, air accumulates in a region 91. The inlet 81 of the bypass tube 80 is (e.g., represents) the highest point of the cooling circuit, and thus, the air in region 91 may pass through the inlet 81 when negative pressure is present at the lower end of the bypass tube 80.

Figure 6:
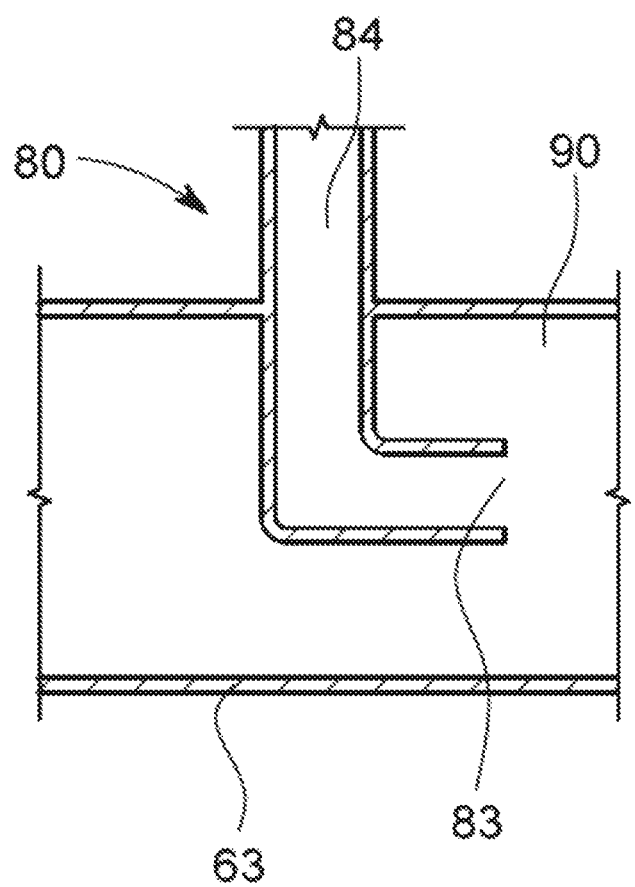
FIG. 6 is an enlarged cross-sectional view of a lower part of the bypass tube shown in FIG. 4.

FIG. 6 is a schematic illustration of a cross-sectional view through a part of the cooling tube 63 at where the outlet 83 of the bypass tube 80 is centrally positioned within the cooling tube 63. For purposes of illustration, the liquid fluid 90 flowing through the cooling tube 63 towards the outlet 71 of the cooling circuit is not particularly shown in the drawing. Here, air moves through a space 84 in the interior of the bypass tube 80. The bypass tube 80 passes through a wall of the cooling tube 63 and is bent in (e.g., is bent to extend in) a downstream direction of the liquid fluid 90. When the flow velocity of the liquid fluid 90 within the cooling tube 63 is higher than the flow velocity in the coolant recipient 61.2 at the upper level 220, the air within space 84 will be sucked out of the bypass tube 80 and will move towards the outlet 71 of the cooling circuit.

Figure 7:
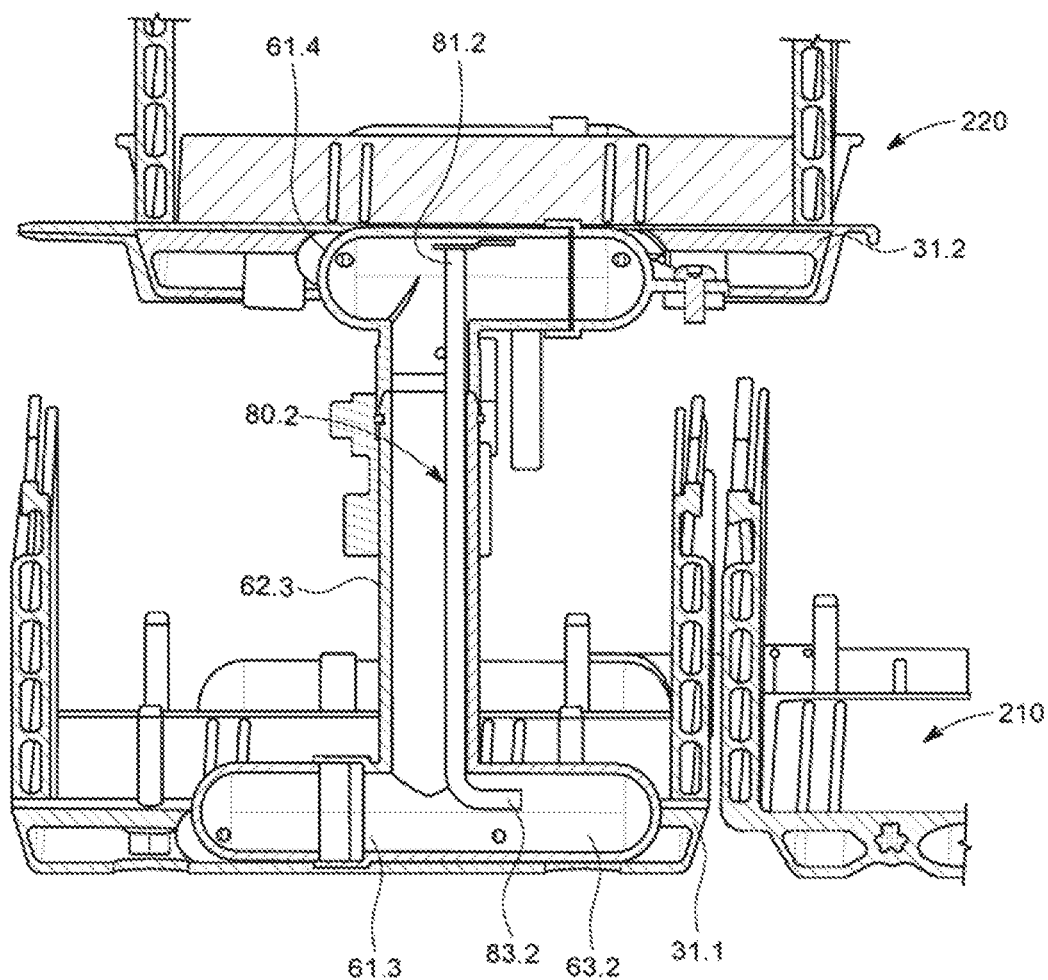
FIG. 7 illustrates another embodiment of the bypass tube according to the present invention.

FIG. 7 is a cross-sectional view of another embodiment including a bypass tube 80.2. In this embodiment, the battery pack is a two-level battery pack including an upper level 220 and lower level 210 similar to the embodiment described above with respect to FIGS. 3 and 4, but the present invention is not limited thereto. A coolant recipient 61.4 is joined to the outlets of the integral cooling channel structures of the carrier plate 31.2. A connection tube 62.3 is tightly fitted to a lower part of the coolant recipient 61.4. The connection tube 62.3 is integrally formed with a coolant recipient 61.3 and a cooling tube 63.2 provided at the lower level 210 of the battery pack. The bypass tube 80.2 passes through the interior of the connection tube 62.3. An inlet opening 81.2 of the bypass tube 80.2 is arranged close to (e.g., is assembled close to) an upper wall of the coolant recipient 61.4. An outlet opening 83.2 of the bypass tube 80.2 is located within the cooling tube 63.2. The bypass tube 80.2 is firmly fixed to the connection tube 62.3.

Although example embodiments of the present invention have been described and illustrated herein, many modifications and variations within those embodiments will be apparent to those skilled in the art. Accordingly, it is to be understood that the present invention may be embodied in forms other than as described herein without departing from the spirit and scope of the present invention. The present invention is defined by the following claims and equivalents thereof.

What is claimed is:

1. A battery pack for a vehicle, the battery pack comprising:
   a plurality of battery modules, a first one of the battery modules being arranged in a first level from among a plurality of levels of the battery pack, a second one of the battery modules being arranged in a second level of the battery pack, the first level being below the second level in a vertical direction, each of the battery modules being in a housing having a cooling channel structure; and
   a liquid cooling circuit in thermal contact with the cooling channel structures of the housings of the first and second ones of the battery modules respectively in the first and second levels of the battery pack, the liquid cooling circuit comprising:
   an inlet in the first level of the battery pack and at a first side of the first one of the battery modules;
   an outlet in the first level of the battery pack and at a second side of the first one of the battery modules,
   a first connection tube vertically extending between the inlet and the housing of the second one of the battery modules in the second level of the battery pack;
   a second connection tube vertically extending between the housing of the second one of the battery modules and the outlet; and
   a bypass tube having an inlet opening at a highest point of the liquid cooling circuit in the vertical direction and an outlet opening within the liquid cooling circuit at a lower point of the liquid cooling circuit than the highest point of the liquid cooling circuit, the outlet opening of the bypass tube being between an end of the second connection tube in the first level of the battery pack and the outlet, wherein the highest point of the liquid cooling circuit is in the second level of the battery pack, and the lower point of the liquid cooling circuit is in the first level of the battery pack.

2. The battery pack of claim 1, wherein the liquid cooling circuit further comprises a cooling tube, and
wherein the outlet opening of the bypass tube is in the cooling tube at a lowest level of the battery pack.

3. The battery pack of claim 2,
wherein the bypass tube passes through an interior of the second connection tube.

4. The battery pack of claim 2, wherein a ratio of a cross-sectional size of the outlet opening of the bypass tube and a cross-sectional size of the cooling tube at the outlet opening is in a range of 1:2 to 1:10.

5. The battery pack of claim 2, wherein a ratio of a cross-sectional size of the outlet opening of the bypass tube and a cross-sectional size of the cooling tube at the outlet opening is in a range of 1:3 to 1:5.

6. The battery pack of claim 1, wherein each of the battery modules comprises a carrier plate, the cooling channel structure in the housings being integral with respective the carrier plate,
wherein the corresponding one of the battery modules is arranged on the corresponding one of the carrier plates,
wherein the liquid cooling circuit further comprises a first coolant recipient connected to outlet openings of the integral cooling channel structure of the carrier plate of the housing of the first one of the battery modules and a second coolant recipient connected to outlet openings of the integral cooling channel structure of the carrier plate of the housing of the second one of the battery modules, and
wherein the inlet opening of the bypass tube is at the second coolant recipient.

* * * * *